United States Patent
Scott et al.

(10) Patent No.: US 10,521,132 B1
(45) Date of Patent: Dec. 31, 2019

(54) DYNAMIC SCRATCH POOL MANAGEMENT ON A VIRTUAL TAPE SYSTEM

(71) Applicant: International Business Machines Corporation, Armonk, NY (US)

(72) Inventors: Michael R. Scott, Ocean View, HI (US); David C. Reed, Tucson, AZ (US); Sosuke Matsui, Tokyo (JP); Derek L. Erdmann, Pima, AZ (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/010,461

(22) Filed: Jun. 17, 2018

(51) Int. Cl.
*G06F 3/06* (2006.01)

(52) U.S. Cl.
CPC .......... *G06F 3/0617* (2013.01); *G06F 3/0608* (2013.01); *G06F 3/0631* (2013.01); *G06F 3/0644* (2013.01); *G06F 3/0664* (2013.01); *G06F 3/0682* (2013.01)

(58) Field of Classification Search
CPC .... G06F 3/0608; G06F 3/0617; G06F 3/0641; G06F 3/0644; G06F 3/0664; G06F 3/0682
See application file for complete search history.

(56) References Cited

U.S. PATENT DOCUMENTS

| | | | |
|---|---|---|---|
| 6,513,101 B1 | 1/2003 | Fisher et al. | |
| 7,478,216 B2 * | 1/2009 | Carlson | G06F 3/0605 |
| | | | 711/154 |
| 8,595,430 B2 | 11/2013 | Iwasaki et al. | |
| 9,213,496 B2 * | 12/2015 | Gibble | G06F 3/0608 |
| 9,372,801 B2 | 6/2016 | Beeston et al. | |
| 9,552,370 B1 | 1/2017 | McCloskey et al. | |
| 2004/0044855 A1 * | 3/2004 | Carlson | G06F 3/0613 |
| | | | 711/154 |

* cited by examiner

*Primary Examiner* — Aracelis Ruiz
(74) *Attorney, Agent, or Firm* — Nelson and Nelson; Daniel P. Nelson; Alexis V. Nelson

(57) ABSTRACT

A method for managing volumes in a scratch pool of a virtual tape system is disclosed. In one embodiment, such a method provides a scratch pool containing volumes for use in a virtual tape system. The method further enables a user to predefine an external pool of volumes residing outside of the scratch pool. This external pool may be hidden to a host system accessing the virtual tape system. The method monitors current and/or past usage of the volumes in the scratch pool and, based on the usage, predicts a future need for volumes in the scratch pool. The method automatically moves volumes between the external pool and the scratch pool in accordance with the future need. A corresponding system and computer program product are also disclosed.

20 Claims, 7 Drawing Sheets

DYNAMIC SCRATCH POOL MANAGEMENT ON A VIRTUAL TAPE SYSTEM

BACKGROUND

Field of the Invention

This invention relates to systems and methods for managing scratch pools in virtual tape systems.

Background of the Invention

As data storage needs continue to increase at a rapid rate, magnetic tape continues to offer some significant advantages over other data storage technologies. At an average cost on the order of $0.01 per gigabyte, tape storage is typically the most affordable option for storing massive quantities of data. Recent technological advances have also increased the speed that data can be written to and/or retrieved from tape, with some tape drives having the ability to read and/or write data at speeds of over 1 terabyte per hour. Other advantages of magnetic tape include reduced energy costs associated with storing data, portability, greater reliability and longevity, and the ability to easily scale tape storage as storage needs increase. For the reasons provided above, tape storage often plays a significant role in an organization's data storage infrastructure.

A virtual tape system (VTS) is a storage solution that combines a high-speed disk cache with tape automation, tape drives, and intelligent storage management software running on a server. The disk cache associated with the VTS acts as a buffer to the tape drives, providing near-instantaneous performance for multiple, simultaneous scratch-mount requests and for specific mount requests for tape volumes that reside in the disk cache. A VTS breaks the one-to-one connection between a logical tape drive and a physical tape drive, enabling logical access to significantly more tape drives than are physically installed. In addition, a VTS breaks the one-to-one connection between a tape cartridge and a tape volume. One key reason tapes are significantly underutilized is that a single application may own a particular drive and the associated tapes. If that application does not fully utilize the associated tape capacity, it may be wasted.

In a VTS, a user typically must have at least one volume available in a scratch pool in order to satisfy a request to mount a volume to write new files to tape. It is common for a scratch pool to run out of volumes, which can cause disruption to batch and online processing. When this occurs, an administrator must typically intervene to free up additional volumes to be placed in the scratch pool. This can be a time-consuming process that may undesirably cause delays to production cycles. To avoid such delays, an administrator may need to decide how many scratch volumes are needed in the pool and monitor the number of volumes to ensure production cycles are not negatively impacted by running out of scratch volumes.

In view of the foregoing, what are needed are systems and methods to monitor scratch pools and automatically add scratch volumes to the scratch pools on an as-need basis. Ideally, such systems and methods will minimize impacts to production activities such as batch and online processing.

SUMMARY

The invention has been developed in response to the present state of the art and, in particular, in response to the problems and needs in the art that have not yet been fully solved by currently available systems and methods. Accordingly, systems and methods are disclosed for managing scratch pool volumes in a virtual tape system. The features and advantages of the invention will become more fully apparent from the following description and appended claims, or may be learned by practice of the invention as set forth hereinafter.

Consistent with the foregoing, a method for managing volumes in a scratch pool of a virtual tape system is disclosed. In one embodiment, such a method provides a scratch pool containing volumes for use in a virtual tape system. The method further enables a user to predefine an external pool of volumes residing outside of the scratch pool. This external pool may be hidden to a host system accessing the virtual tape system. The method monitors current and/or past usage of the volumes in the scratch pool and, based on the usage, predicts a future need for volumes in the scratch pool. The method automatically moves volumes between the external pool and the scratch pool in accordance with the future need.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
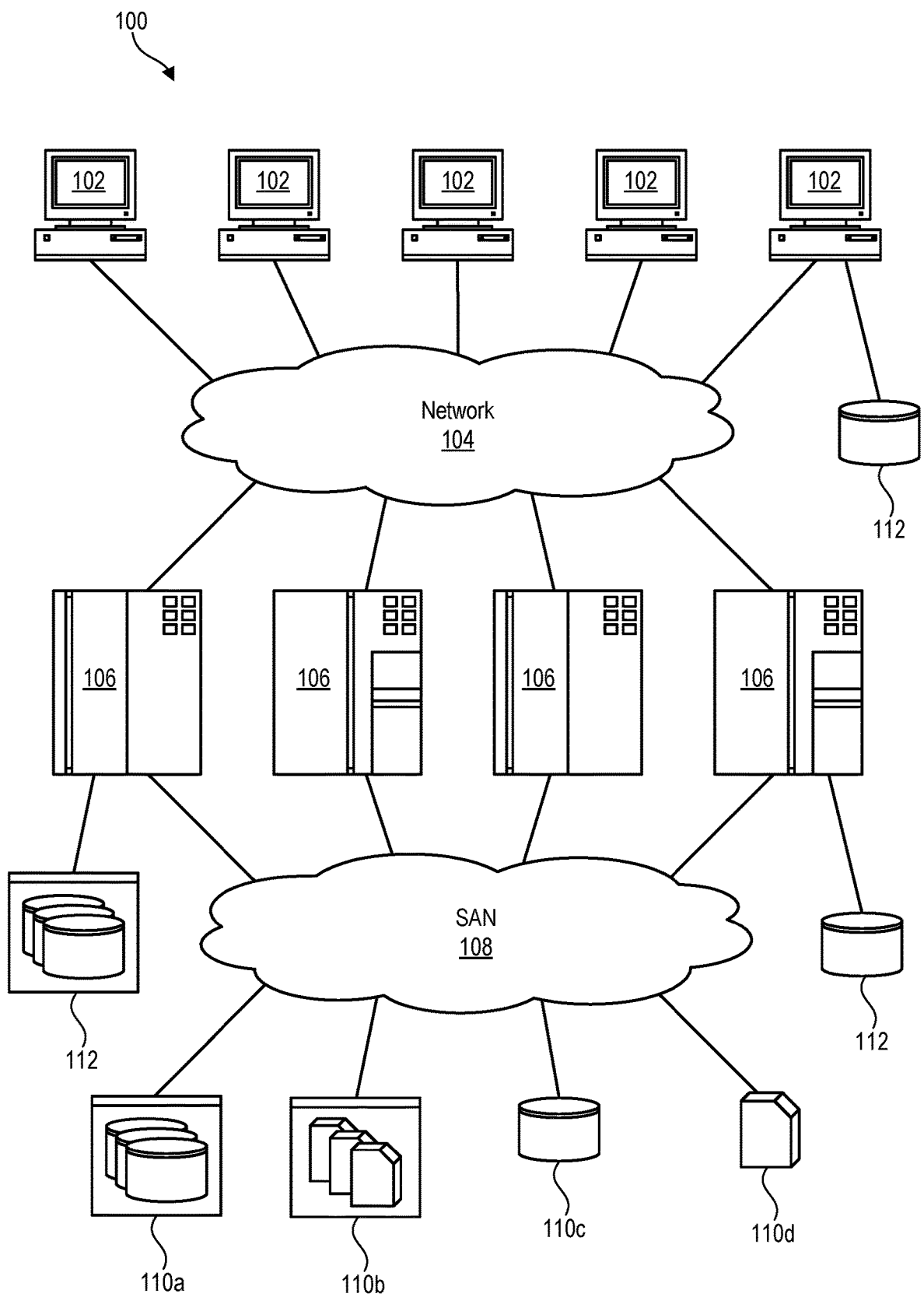
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, tape libraries, virtual tape libraries etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b or virtual tape libraries 110b, individual hard-disk drives 110c or solid-state drives 110c, tape drives 110d or virtual tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
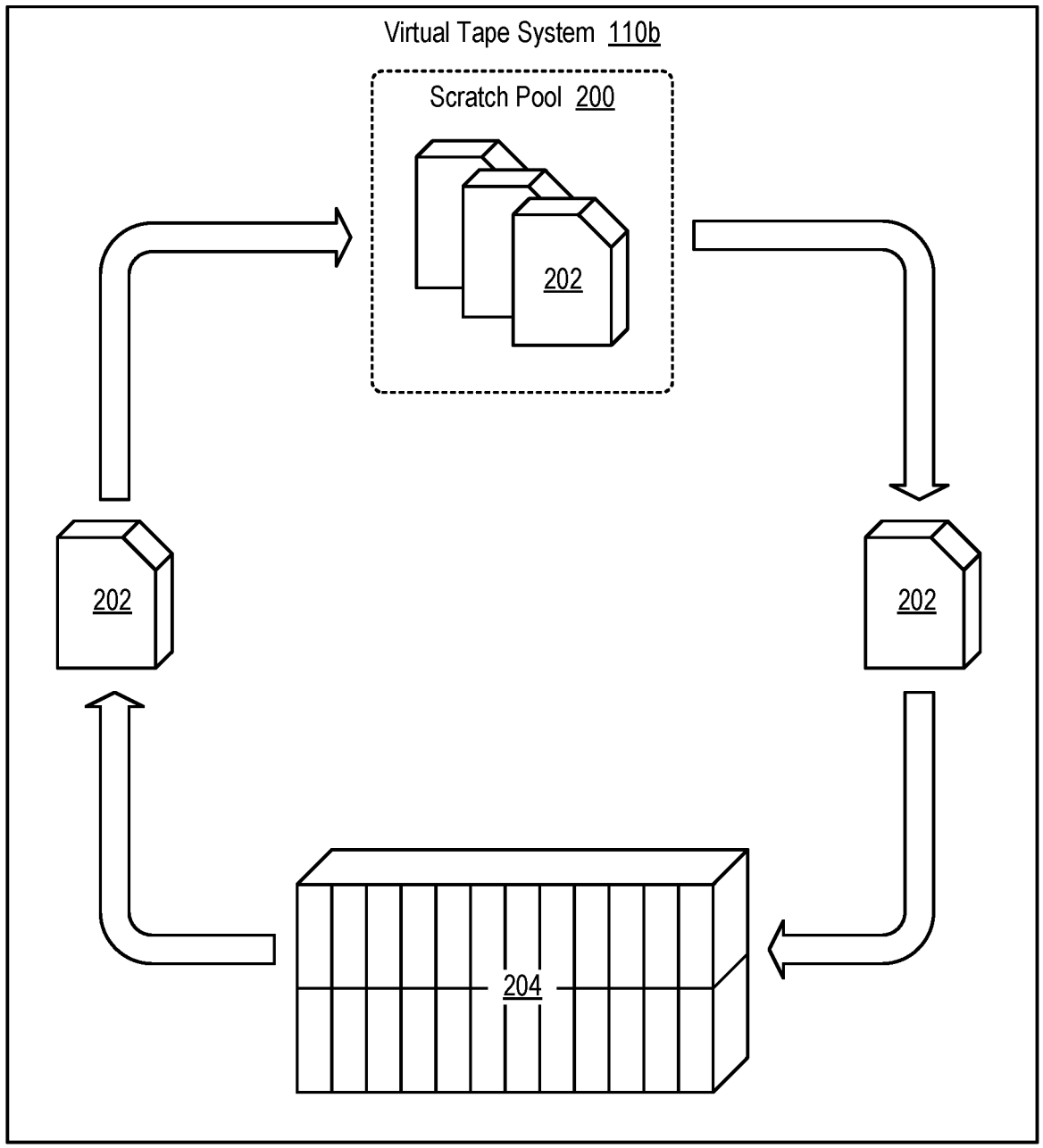
FIG. 2 is a high-level block diagram showing a virtual tape system utilizing a scratch pool of volumes to accommodate volume mount requests.

Referring to FIG. 2, in certain embodiments, a virtual tape library 110b (also referred to herein as a virtual tape system 110b), may utilize a scratch pool 200 of virtual tape volumes 202 to accommodate requests to mount volumes to store files thereon. When a volume 202 is full of data, the volume 202 may be inventoried in an archive 204 until the data is no longer needed or has expired. At this point, the volume 202 may be returned to the scratch pool 200 so it can be reused for future mount requests.

As previously mentioned, a virtual tape system 110b must typically have at least one volume 202 available in its scratch pool 200 in order to satisfy a request to mount a volume 202 to write new files to tape. It is common for a scratch pool 200 to run out of volumes 202, which can cause disruption to production activities such as batch and online processing. When this occurs, an administrator may need to intervene to free up additional volumes 202 for placement in the scratch pool 200. This can be a time-consuming process that may undesirably cause delays to production cycles. To avoid such delays, an administrator may need to decide how many scratch volumes 202 are needed in the scratch pool 200 and monitor the level of available scratch volumes 202 to make sure production cycles are not adversely impacted by running out of scratch volumes 202.

Figure 3:
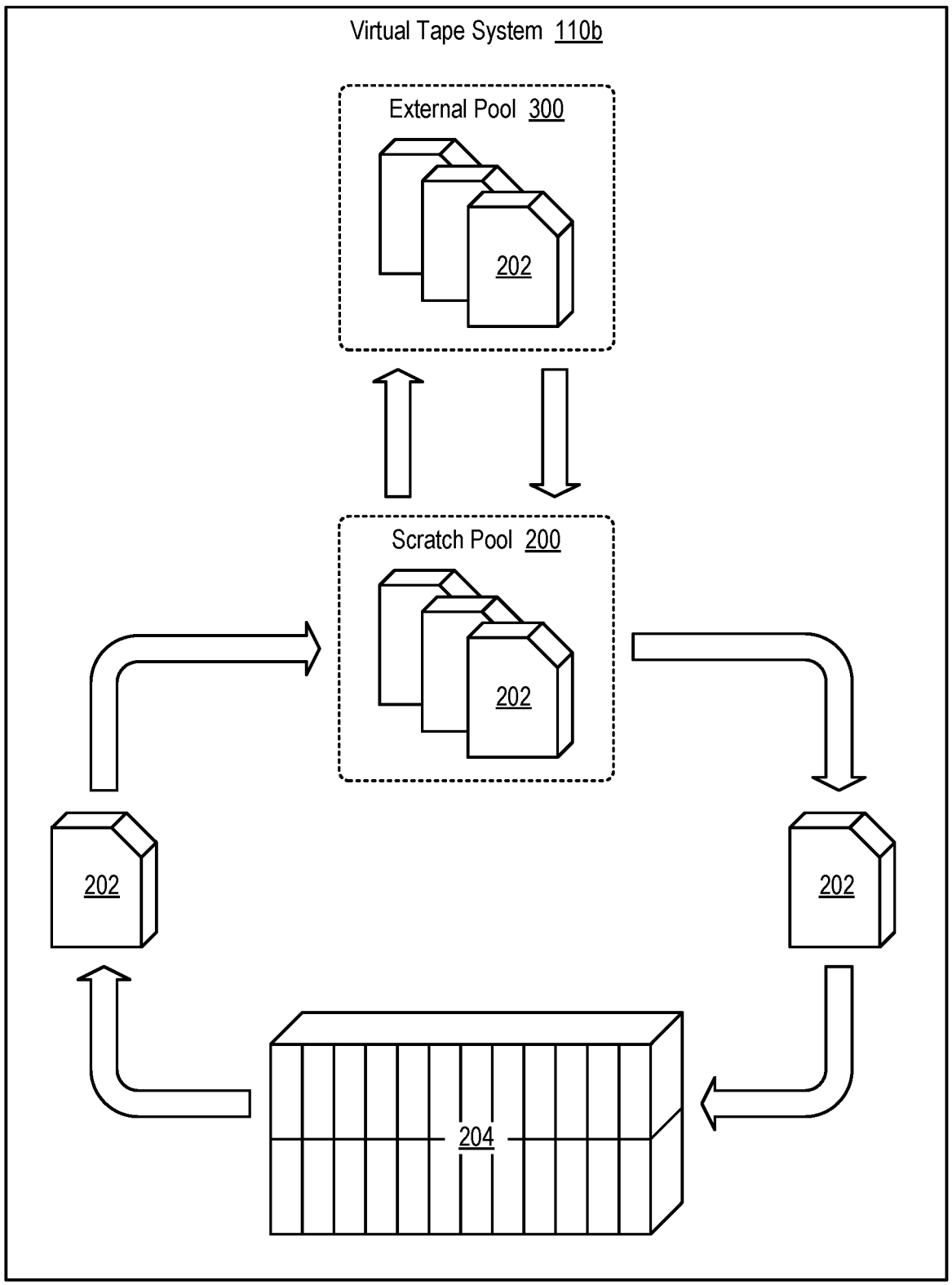
FIG. 3 is a high-level block diagram showing an external pool of volumes used to dynamically increase a number of volumes in the scratch pool.

Referring to FIG. 3, in certain embodiments in accordance with the invention, an external pool 300 of volumes 202 may be established to increase a number of scratch volumes 202 in the scratch pool 200. In certain embodiments, the volumes 202 in the external pool 300 may be predefined in advance. For example, the volumes 202 in the external pool 300 may be assigned a range of volume serial numbers (i.e., volsers), default constructs, and media types. The default constructs may establish whether the volumes 202 support encryption and/or compression and, if so, what types of encryption/compression the volumes 202 support. The default constructs may also establish the storage capacities of the volumes 202, the recording technologies use to record data on the volumes 202, and the like. The designated media types may indicate the type of magnetic tape the volumes 202 are configured to emulate. Because defining the characteristics of the volumes 202 may take significant time, predefining the volumes 202 in the external pool 300 before they are actually needed may reduce delay and enable the volumes 202 to be dynamically added to the scratch pool 200 on an as-need basis.

Although the virtual tape system 110b in FIG. 3 is shown with a single scratch pool 200 and external pool 300, in reality the virtual tape system 110b may include multiple scratch pools 200 and external pools 300. Each scratch pool 200 and external pool 300 may have its own volume serial numbers, default constructs, and media types. The volumes 202 in an external pool 300 may be predefined with volume serial numbers, default constructs, and media types that are consistent with the scratch pool 200 to which it is assigned. This enables volumes 202 to be dynamically added to the scratch pool 200 while assuring that the volumes 202 in the external pool 300 have the characteristics required of volumes 202 in the scratch pool 200. In certain cases, the volumes 202 in the external pool 300 may be dynamically and automatically moved to the scratch pool 200 to accommodate temporary or unanticipated spikes in workload processing.

Figure 4:
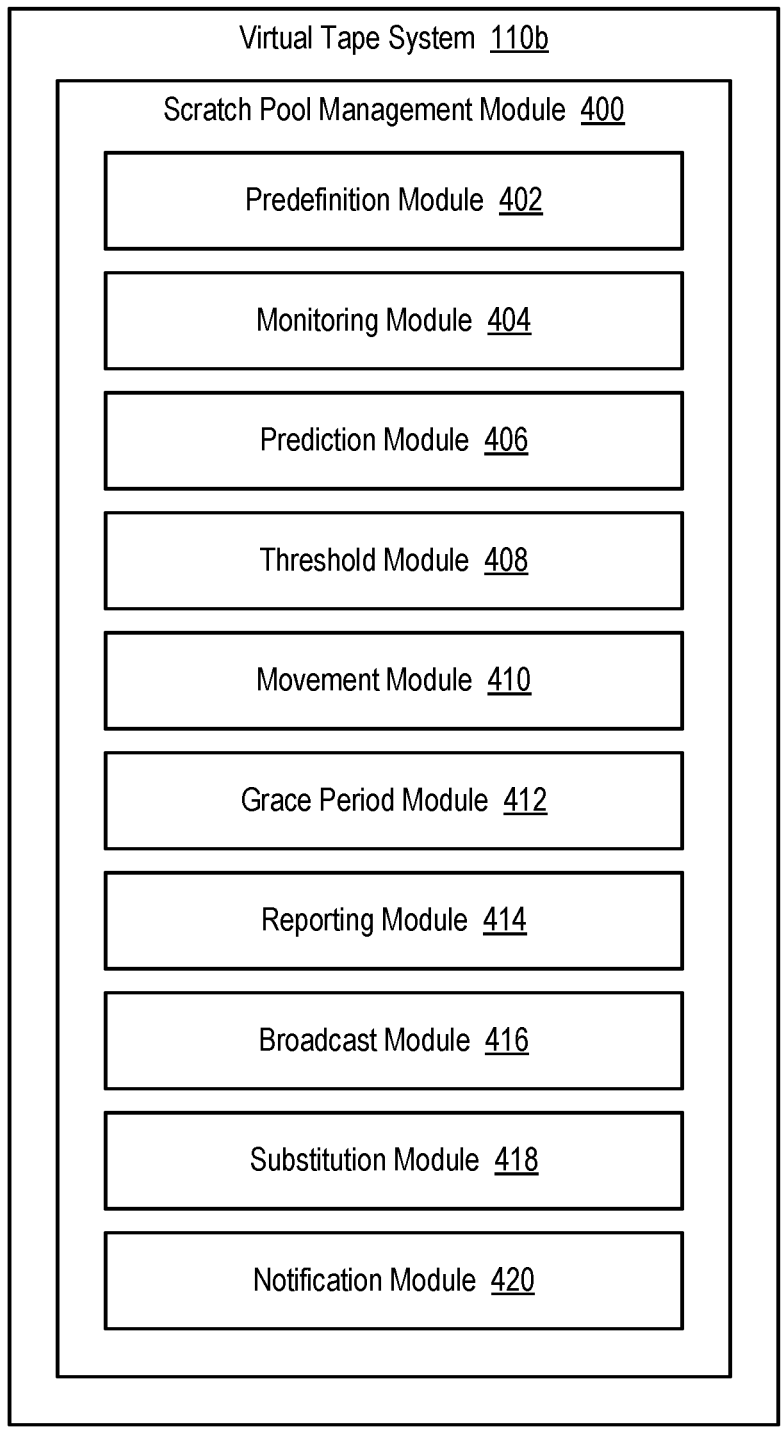
FIG. 4 is a high-level block diagram showing a scratch pool management module and various sub-modules.

Referring to FIG. 4, in order to provide various features and functions in association with the external pool 300, a scratch pool management module 400 may be included in the virtual tape system 110b. The scratch pool management module 400 may be implemented in software, hardware, firmware, or a combination thereof. In general, the scratch pool management module 400 may be used to manage volumes 202 in the scratch pool 200 and dynamically add volumes 202 to the scratch pool 200 on an as-need basis and/or to anticipate a future need.

As shown, the scratch pool management module 400 may include various sub-modules to provide different features and functions. The sub-modules may include one or more of a predefinition module 402, monitoring module 404, prediction module 406, threshold module 408, movement module 410, grace period module 412, reporting module 414, broadcast module 416, substitution module 418, and notification module 420. These sub-modules are presented by way of example and not limitation. More of fewer modules may be provided in different embodiments. For example, the functionality of some sub-modules may be combined into a single or smaller number of sub-modules, or the functionality of a single sub-module may, in certain embodiments, be distributed across several sub-modules.

The predefinition module 402 may enable a user to predefine an external pool 300 for a scratch pool 200, as well as volumes 202 within the external pool 300. For example, the predefinition module 402 may enable a user to define a range of volume serial numbers (i.e., volsers) for the external pool 300, as well as default constructs, default media types, thresholds, and the like, for volumes 202 within the external pool 300. This may be performed before the volumes 202 in the external pool 300 are actually needed within the scratch pool 200.

The monitoring module 404 may monitor usage of volumes 202 in the scratch pool 200. This may include monitoring past and present usage as well as the number of volumes 202 that are available in the scratch pool 200 during these time periods. The monitoring module 404 may also monitor peak usage times or spikes in usage that may consume additional volumes 202 in the scratch pool 200, or times or periods when the scratch pool 200 ran out of volumes 202. In other cases, the monitoring module 404 may monitor the growth rate of volumes 202 in the scratch pool 200 and, in certain embodiments, whether this growth rate is outside of normal or an indicator of some type of problem or error. In addition to monitoring usage of volumes 202 in the scratch pool 200 (i.e., volumes 202 changing from scratch to private), the monitoring module 404 may also monitor the return of volumes 202 from the archive 204 to the scratch pool 200 (i.e., volumes 202 changing from private to scratch). The monitoring module 404 may, in certain embodiments, record observed numbers in a log and keep a rolling average (e.g., a 30 day rolling average) in order to track trends in scratch volume 202 consumption and return to the scratch pool 200.

Based on the usage, growth rates, trends, etc. monitored by the monitoring module 404, the prediction module 406 may predict future need for volumes 202 in the scratch pool 200. Alternatively, or in addition, a threshold module 408 may detect whether a number of volumes 202 in the scratch pool 200 has fallen below a threshold associated with the scratch pool 200. This threshold may, in certain embodiments, be based on future need determined by the prediction module 406. For example, the threshold may be set at ninety percent of the designated need. If the number of volumes 202 in the scratch pool 200 falls below this threshold, the movement module 410 may move volumes 202 from the external pool 300 to the scratch pool 200 to more closely align the number of volumes 202 in the scratch pool 200 with the designated need for volumes 202.

In certain embodiments, the scratch pool management module 400 carefully manages the number of volumes 202 in the scratch pool 200 to avoid exceeding the designated need and thereby placing additional processing and bookkeeping overhead on host systems 106 using the virtual tape system 110b. In certain embodiments, the movement module 410 is configured to move volumes 202 from the scratch pool 200 to the external pool 300 when the scratch pool 200 contains more volumes 202 than are needed or anticipated to be needed.

When volumes 202 are returned to the scratch pool 200 from the archive 204, such as when data has expired or is no longer needed, the grace period module 412 may, in certain embodiments, provide a host system 106 a certain amount of time (i.e., a "grace period") to still be able to access data on the returned volumes 202. Thus, in certain cases, volumes 202 that have been returned to the scratch pool 200 may not be available for reuse by the virtual tape system 110b until the grace period has expired. In certain embodiments, the monitoring module 404 may take this grace period into account when determining how many volumes 202 are not just present in the scratch pool 200, but are actually available for reuse. This, in turn, may affect how many volumes 202 are moved from the external pool 300 to the scratch pool 200 to accommodate the designated need.

Using data gathered by the monitoring module 404, the reporting module 414 may create reports showing which host systems 106, programs, job names, and data set naming patterns are consuming volumes 202 in the scratch pool 200. This may help an administrator determine if the behavior is expected or if configurations changes are needed in the workload. Thus, in certain embodiments, data that is collected by the monitoring module 404 and used by the prediction module 406 to forecast need may also be provided to an administrator in reports so that the administrator may use the data to make decisions or configuration changes in the virtual tape system 110b. This data may help an administrator understand what is consuming volumes 202 in the scratch pool 200 and/or why the volumes 202 are being consumed faster or at a different rate than expected.

When volumes 202 are moved from the external pool 300 to the scratch pool 200, or vice versa, the broadcast module 416 may communicate these changes to connected host systems 106. In certain embodiments, software (e.g., tape management system software) on a host system 106 may receive the broadcast and update its internal records, such as a tape configuration database and/or tape management system database.

When a user attempts to insert/define new volumes 202 in the scratch pool 200, the substitution module 418 may check whether volumes 202 already exist in the external pool 300. If volumes 202 are present in the external pool 300, the substitution module 418 may substitute the volumes 202 in the external pool 300 for those the user is attempting to insert/define. These volumes 202 may then be moved from the external pool 300 to the scratch pool 200 in lieu of the attempted insertion. If the volumes 202 the user is attempting to insert are not in the external pool 300, the volumes 202 may be inserted into the scratch pool 200 in the conventional manner using conventional insert processing.

In the event the external pool 300 is anticipated to run out of volumes 202, the notification module 420 may notify a user via, for example, a console message, that additional volumes 202 (i.e., an additional volser range) need to be added to the external pool 300. This may performed well in advance of the external pool 300 actually running out of volumes 202. This enables the user to define additional volumes 202 in the external pool 300 so that the volumes 202 are available to the scratch pool 200 but without actually placing additional volumes 202 in the scratch pool 200 until they are needed. This will prevent over-allocation of volumes 202 to the scratch pool 200 and the attendant negative effects to host performance.

Figure 5:
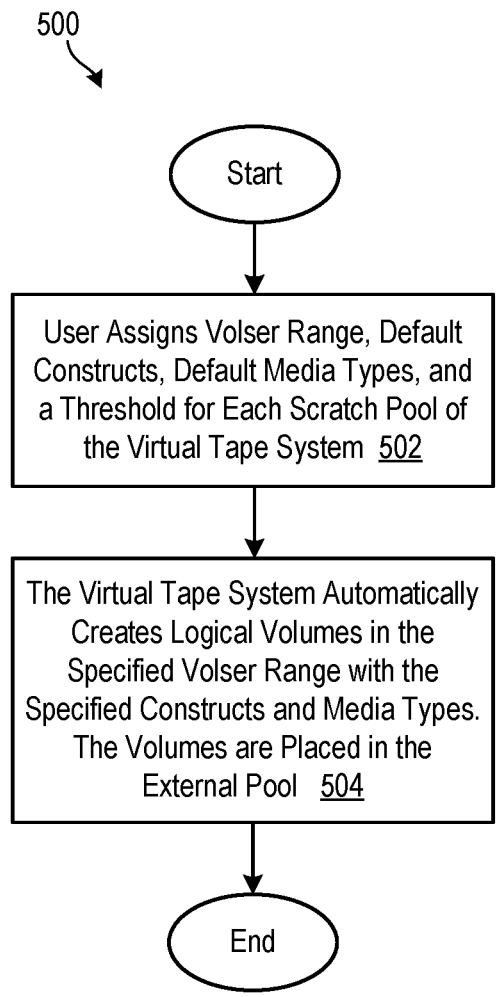
FIG. 5 is a process flow diagram showing a method for predefining an external pool of volumes.

Referring to FIG. 5, one embodiment of a method 500 for predefining an external pool 300 of volumes 202 is illustrated. This method 500 may, in certain embodiments, be executed by the predefinition module 402 previously discussed. As shown, the method 500 may enable a user to assign 502 a range of volume serial numbers (volsers) to an external pool 300, as well as specify default constructs, default media types (e.g., what type of magnetic tape to emulate), and the like. The user may also specify thresholds for each scratch pool 200 of the virtual tape system 110b. For example, the user may configure the virtual tape system 110b to move volumes 202 from the external pool 300 to the scratch pool 200 if the number of volumes 202 in the scratch pool 200 falls below a certain specified number or percentage.

Using the configuration settings established at step 502, the virtual tape system 110b may automatically create 504 logical volumes 202 in the specified volser range with the specified constructs and media types. These logical volumes 202 may be placed in the external pool 300 so they are available for movement to the scratch pool 200 if and when they are needed.

Figure 6:
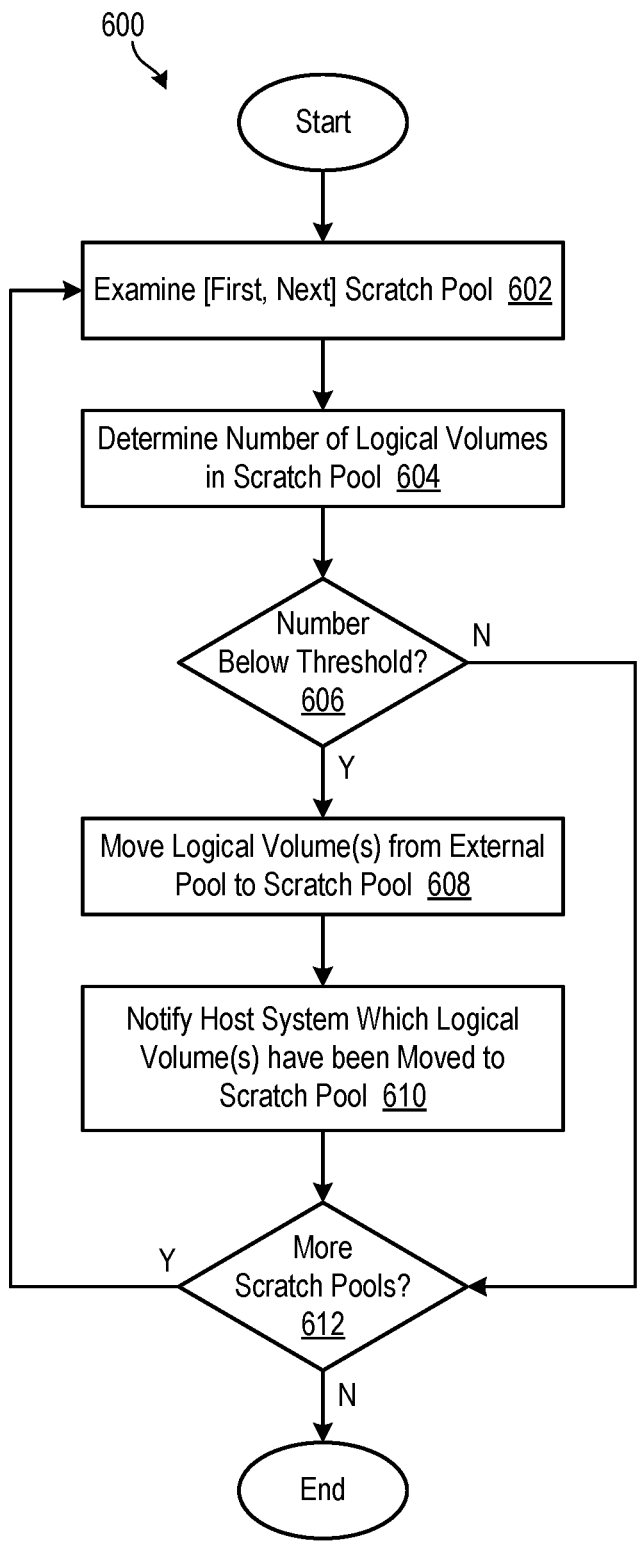
FIG. 6 is a process flow diagram showing a method for utilizing the external pool to increase the number of volumes in the scratch pool.

Referring to FIG. 6, a method 600 for utilizing the external pool 300 to increase a number of volumes 202 in the scratch pool 200 is illustrated. This method 600 may, in certain embodiments, be executed by the threshold module 408 and movement module 410 previously discussed. This method 600 may be executed after the scratch pools 200 and associated external pools 300 have been established. As shown, the method 600 initially examines 602 a first scratch pool 200 of the set of scratch pools 200. The method 600 then determines 604 the number of logical volumes 202 in the scratch pool 200. If, at step 606, the number of logical volumes 202 is below the threshold established for the scratch pool 200, the method 600 may move 608 logical volumes 202 from the associated external pool 300 to the scratch pool 200. The number of logical volumes 202 that are moved may, in certain embodiments, depend on the amount that the threshold is exceeded.

The method 600 may then notify 610 any connected host systems 106 of the logical volumes 202 that have been moved into the scratch pool 200. This may allow the host systems 106 to update their internal catalogs and/or databases. For example, the notification may prompt tape management software on the host systems 106 to update their tape configuration databases and/or tape management system databases. The method 600 may then be repeated 612 for each scratch pool 200 and associated external pool 300 in the virtual tape system 110b. The method 600 may be executed periodically to maintain a needed number of volumes 202 in the scratch pools 200.

Figure 7:
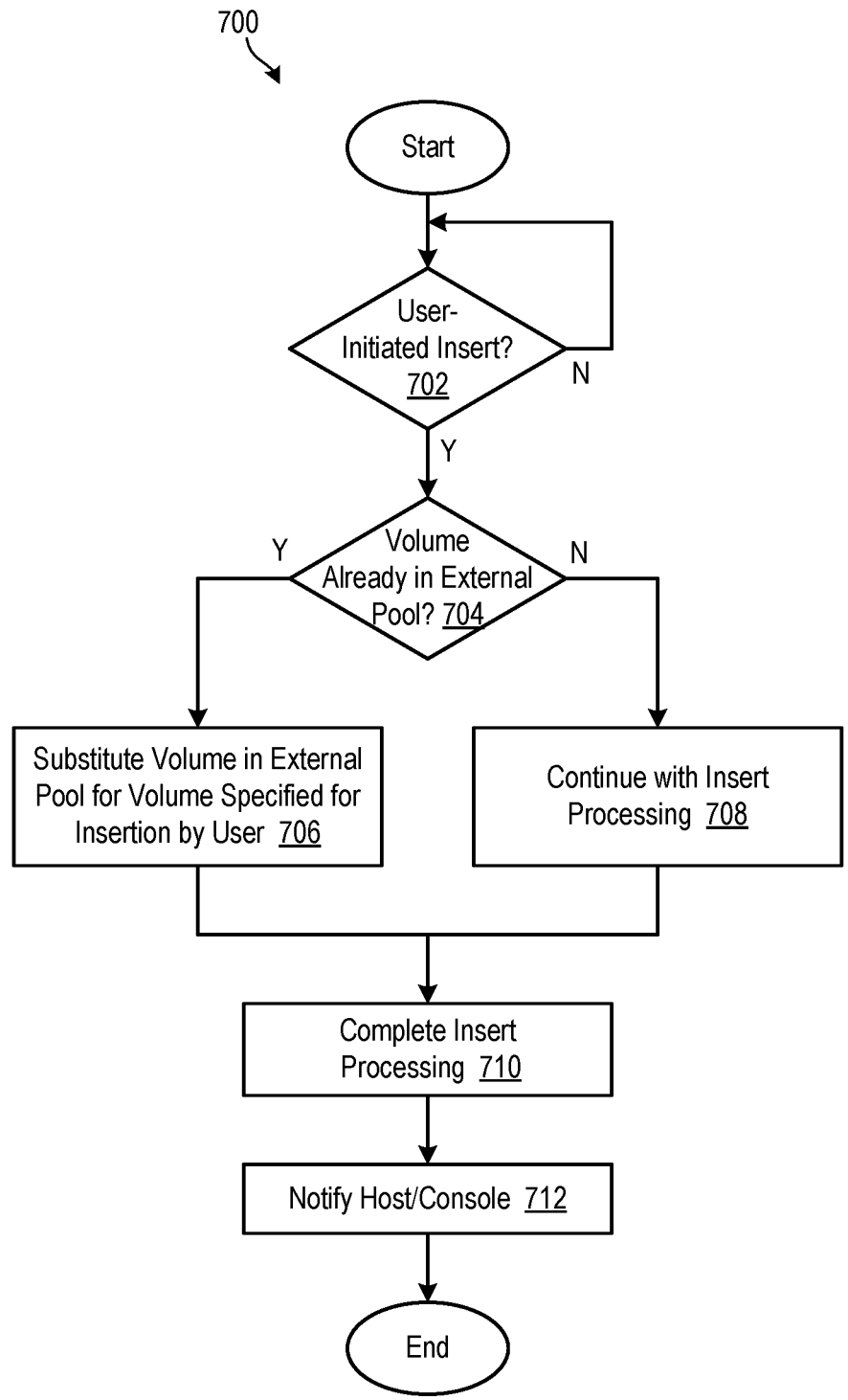
FIG. 7 is a process flow diagram showing a method for substituting external pool volumes for those that are manually inserted.

FIG. 7 shows embodiment of a method 700 for substituting external pool volumes 202 for those that are manually inserted by a user. This method 700 may, in certain embodiments, be executed by the substitution module 418 previously discussed. As shown, the method 700 initially detects 702 when a user is attempting to insert volumes 202 into a scratch pool 200. When this occurs, the method 700 determines 704 whether the volumes 202 that are being inserted are already defined in an external pool 300 associated with the scratch pool 200. If the volumes 202 are already defined in the external pool 300, the method 700 substitutes 706 the volumes 202 from the external pool 300 for those being inserted by the user (particularly if the volumes 202 in the external pool 300 have the same volsers as those being inserted by the user). If the volumes 202 are not already defined in the external pool 300, the method 700 may continue 708 with insert processing in the conventional manner. The method 700 completes 710 the insert processing by inserting the volumes 202 into the scratch pool. The method 700 may also notify 712 any connected host systems 106 and/or administrator consoles that volumes 202 were added to the scratch pool 200 so that the host systems 106 and/or administrator consoles may updates their internal records/databases. In certain embodiments, the method 700 also notifies the host systems 106 and/or administrator consoles that volumes 202 from the external pool 300 were substituted for those that were attempted to be manually inserted.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing volumes in a scratch pool of a virtual tape system, the method comprising:
providing a scratch pool containing volumes for use in a virtual tape system;
predefining an external pool of volumes residing outside of the scratch pool;
monitoring usage of the volumes in the scratch pool;
based on the usage, predicting a future need for volumes in the scratch pool; and
automatically moving volumes between the external pool and the scratch pool in accordance with the future need.

2. The method of claim 1, wherein monitoring usage comprises monitoring at least one of past usage and present usage.

3. The method of claim 1, wherein predefining an external pool of volumes comprises predefining volumes with at least one of a specified range of volume numbers, media type, and storage capacity.

4. The method of claim 1, wherein automatically moving volumes comprises automatically moving volumes between the external pool and the scratch pool in advance of the future need.

5. The method of claim 1, wherein monitoring usage comprises monitoring a number of volumes that are consumed from the scratch pool relative to a number of volumes that are returned to the scratch pool.

6. The method of claim 1, wherein the external pool is hidden to a host system accessing the virtual tape system.

7. The method of claim 1, wherein automatically moving comprises automatically moving when a threshold is reached.

8. A computer program product for managing volumes in a scratch pool of a virtual tape system, the computer program product comprising a computer-readable storage medium having computer-usable program code embodied therein, the computer-usable program code configured to perform the following when executed by at least one processor:
provide a scratch pool containing volumes for use in a virtual tape system;
predefine an external pool of volumes residing outside of the scratch pool;
monitor usage of the volumes in the scratch pool;
based on the usage, predict a future need for volumes in the scratch pool; and
automatically move volumes between the external pool and the scratch pool in accordance with the future need.

9. The computer program product of claim 8, wherein monitoring usage comprises monitoring at least one of present usage and past usage.

10. The computer program product of claim 8, wherein predefining an external pool of volumes comprises predefining volumes with at least one of a specified range of volume numbers, media type, and storage capacity.

11. The computer program product of claim 8, wherein automatically moving volumes comprises automatically moving volumes between the external pool and the scratch pool in advance of the future need.

12. The computer program product of claim 8, wherein monitoring usage comprises monitoring a number of volumes that are consumed from the scratch pool relative to a number of volumes that are returned to the scratch pool.

13. The computer program product of claim 8, wherein the external pool is hidden to a host system accessing the virtual tape system.

14. The computer program product of claim 8, wherein automatically moving comprises automatically moving when a threshold is reached.

15. A system for managing volumes in a scratch pool of a virtual tape system, the system comprising:
at least one processor;
at least one memory device operably coupled to the at least one processor and storing instructions for execution on the at least one processor, the instructions causing the at least one processor to:

provide a scratch pool containing volumes for use in a virtual tape system;
predefine an external pool of volumes residing outside of the scratch pool;
monitor usage of the volumes in the scratch pool;
based on the usage, predict a future need for volumes in the scratch pool; and
automatically move volumes between the external pool and the scratch pool in accordance with the future need.

16. The system of claim 15, wherein predefining an external pool of volumes comprises predefining volumes with at least one of a specified range of volume numbers, media type, and storage capacity.

17. The system of claim 15, wherein automatically moving volumes comprises automatically moving volumes between the external pool and the scratch pool in advance of the future need.

18. The system of claim 15, wherein monitoring usage comprises monitoring a number of volumes that are consumed from the scratch pool relative to a number of volumes that are returned to the scratch pool.

19. The system of claim 15, wherein the external pool is hidden to a host system accessing the virtual tape system.

20. The system of claim 15, wherein automatically moving comprises automatically moving when a threshold is reached.

* * * * *